UNITED STATES PATENT OFFICE.

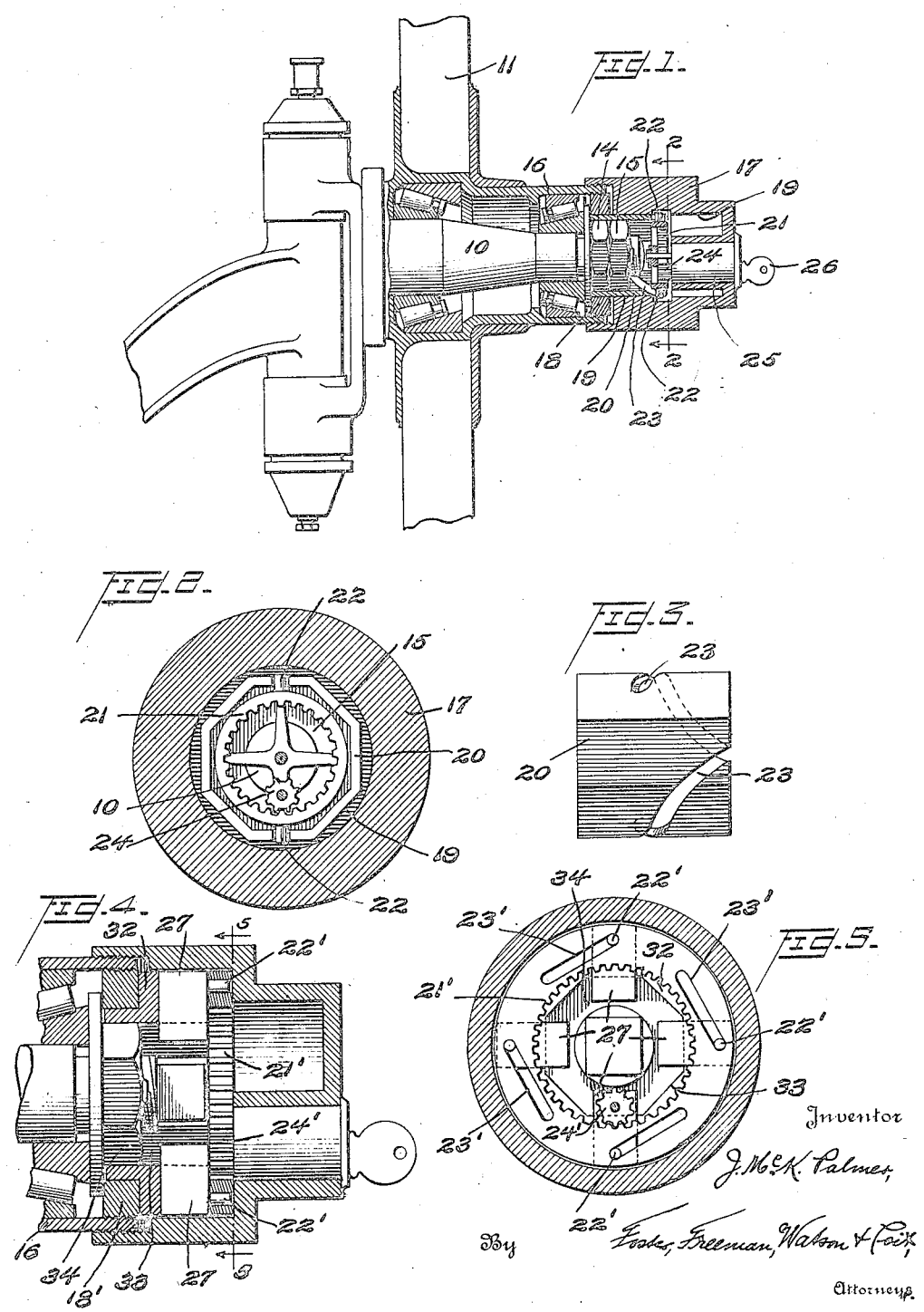

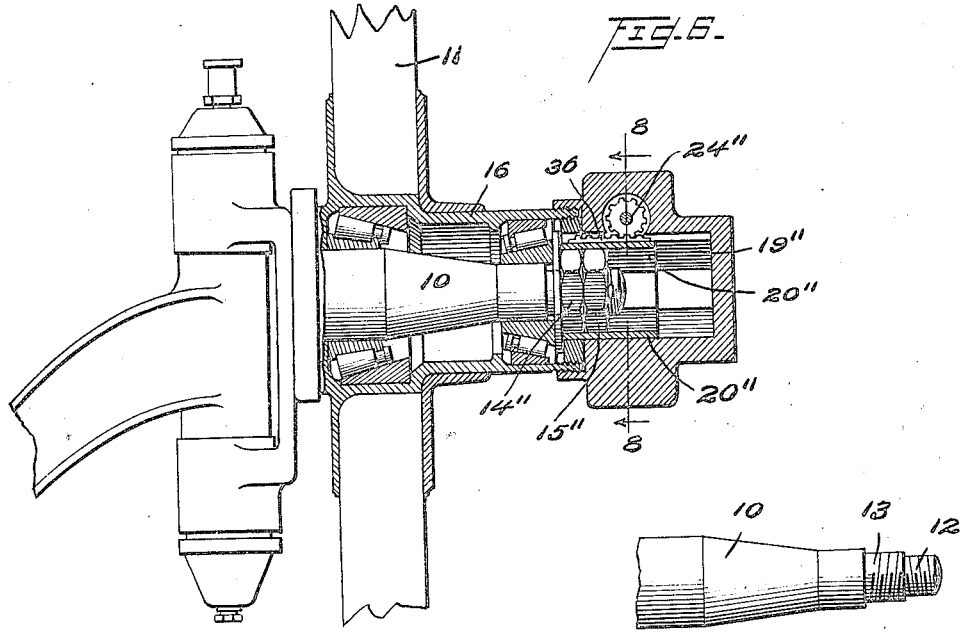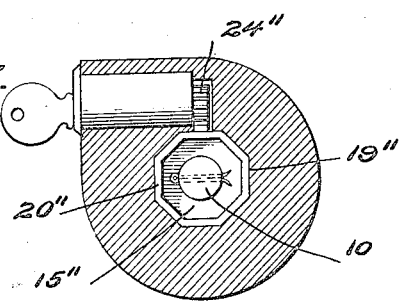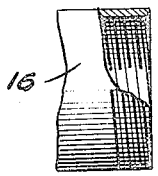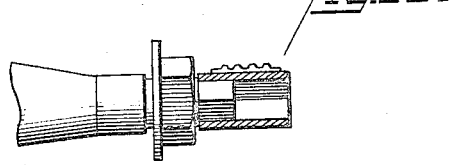

JOHN McKENNEY PALMER, OF SPRINGFIELD, MASSACHUSETTS.

AUTOMOBILE LOCK.

1,426,666. Specification of Letters Patent. Patented Aug. 22, 1922.

Application filed September 13, 1919. Serial No. 323,583.

*To all whom it may concern:*

Be it known that I, JOHN McKENNEY PALMER, a citizen of the United States, residing at Springfield, in the county of Hampden, State of Massachusetts, have invented certain new and useful Improvements in Automobile Locks, of which the following is a specification.

This invention relates to locking devices for vehicles, particularly to wheel locking devices for automobiles, and its object is to provide an article of this class by means of which an automobile or other vehicle may be securely locked and protected against theft or unauthorized use.

Many devices having similar purposes in view have heretofore been designed or suggested, but few have been found to be effective in operation, and the devices actually used are in most cases unsightly and expensive. My improved automobile lock is small in size, inexpensive to manufacture and attach to an automobile, and has a neat and attractive appearance as well as being easily accessible to the operator, and it also obviates the necessity of carrying detached locks in the tool chest or other place upon the machine inasmuch as the lock itself is incorporated with the chassis and it is only necessary for the operator to carry the key thereto. Other advantages of the invention will be apparent. The locking device will be fully disclosed in the following description when taken in connection with the accompanying drawings, in which—

Figure 1 is a vertical section through the front hub of an automobile showing my locking device incorporated therewith;

Figure 2 is a section along the line 2—2 of Fig. 1;

Figure 3 is a side elevation of the locking member;

Figure 4 is a vertical section through portion of a modified form of locking device;

Figure 5 is a section along the line 5—5 of Fig. 4;

Figure 6 is a vertical section through an automobile hub having a second modification of the locking device attached thereto;

Figure 7 is an enlarged view of the spindle shown in Fig. 6 with the nuts removed;

Figure 8 is a section along the line 8—8 of Fig. 6;

Figure 9 is a view of a portion of the wheel hub, and

Figure 10 is a side elevation of a portion of another modification of wheel hub and locking device.

The form of my invention shown in Figs. 1, 2 and 3 is the preferred form for automobiles having the most common wheel hub construction, such as illustrated in Figs. 1 and 6. The spindle 10 is the usual stationary spindle having the wheel 11 rotatably mounted thereon in the usual manner. The outer end of spindle 10 has, however, a portion 12 having a right hand thread and also a portion 13 having a left hand thread as clearly illustrated in Fig. 7. The pitch diameters of these threaded portions are different, as indicated in the drawings, to enable nuts 14 and 15 having left and right hand threads respectively to be screwed thereon and to assume the positions shown in Figs. 1 and 6, in which their adjacent surfaces are together. The wheel hub 16 is exteriorly threaded at its end for the hub cap 17 in the usual manner and is threaded interiorly to receive an annular lock nut 18 having a polygonal central aperture therein, which may be either four-sided, six-sided or eight-sided, this aperture being in alignment with the recess 19 of the hub cap which has a similar polygonal cross-section. Closely fitting against the inside walls of recess or chamber 19 but axially slidable relatively thereto is a sleeve member 20 which is also polygonal both exteriorly and interiorly. While the outside of this sliding member 20 fits the walls of the recess 19, its interior wall fits closely against the sides of the two nuts 14 and 15.

When in position as shown, the nuts 14 and 15 cannot be turned together in either direction inasmuch as one has a right hand thread and the other a left hand thread. It is therefore apparent that with the sleeve 20 in the position shown in Fig. 1 the wheel cannot be rotated relatively to the spindle 10 inasmuch as the member 20, which is locked against rotation by the nuts 14 and 15, has a firm engagement with the hub cap 17 which in turn is non-rotatable relatively to the wheel 11 being keyed to the hub by a plurality of short keys 17'. It can be seen, however, that when the sleeve 20 is moved to the right, Fig. 1, there will be no positive connection between the hub cap and the nuts 14 and 15 and the wheel may be freely rotated relatively to the spindle.

The means for moving sleeve 20 from its locking to its free position comprise the internal gear 21 having diametrically opposed pins 22 fitting in spiral slots 23 in the sleeve 20, and a pinion 24 of the lock 25 which extends longitudinally through the hub cap and is adapted to be operated by the usual key 26. By rotating the key in the lock the pinion 24 is actuated and in turn rotates the internal gear 21, thereby causing sleeve 20 to be moved through the agency of pins 22 working in slots 23.

The hub cap is of substantial construction and well able to withstand the strain of restraining the movement of the automobile even with the engine running, and the various parts of the hub are designed and constructed to withstand great strain. In this form of the invention the locking mechanism is protected from the elements and from any interference by would be thieves or other persons. It is located in a convenient and always accessible portion of the machine, is easily manipulated, and presents a neat and attractive appearance to the observer.

In the form of my invention shown in Figs. 4 and 5 in which the end of the spindle is squared I employ four radially movable jaws 27 each of which is provided with a pin 22' adapted to slide in a slot 23' of the ring member or internal gear 21' operated by a pinion 24' connected with a suitable lock. The jaws 27 move radially in slots in an annular member 32 having a polygonal central aperture 33 the inner wall of which closely fits a similarly polygonal nut 34 on the spindle. If the key is operated to rotate the pinion 24' in such a way as to rotate the internal gear 21' toward the right, Fig. 5, it can be seen that pins 22' will slide in slots 23' to bring jaws 27 against the faces of the spindle. When the pins 22' have reached the ends of slots 23' the wheel will be locked and it will be impossible to move the same until the internal gear is rotated in the opposite direction to release the jaws. In this form of the device an annular lock nut 18' having threaded connection with the hub with threads of the opposite "hand" than the threads on the outside of the hub for the attachment of the hub cap, is provided for preventing the unscrewing of the hub cap when the machine is locked.

In Fig. 6 a modified form is disclosed in which the barrel of the lock instead of extending longitudinally through the hub cap extends transversely of the same and a rack 36 mounted upon the sleeve 20″ is engaged by a pinion 24″ for moving the sleeve to its locking and free positions.

This form of the invention may be employed when the end of the spindle is squared, as illustrated in Fig. 10, and is an especially desirable form used in connection with the lighter motor vehicles having spindles of this character.

It can be seen that when the automobile or other vehicle is stopped the walls of recess 19 or 19″ and hence the inner walls of the sleeve 20 or 20″ will not always be parallel with the sides of the stationary polygonal nuts 14, 15, 14″ or 15″ and it will be necessary in such cases to move the wheel slightly forward or back until the side faces of the nuts are parallel with the inner walls of the sleeve 20 or 20″. The key may then be used to slide the sleeve to its locking position. Similarly in the modification shown in Figs. 4 and 5 the wheel must be rotated to a position in which the inner ends of the jaws 27 are parallel with the outer faces of the squared end of the spindle before the lock can be operated.

It will be apparent that the device described is of great practical utility and is a neat, compact and attractive article as well as a strong and efficient means for rendering the machine safe against theft. Many modifications of the invention may be made and I do not limit myself to the exact forms shown and described.

What is claimed is:

1. In a vehicle, the combination with a non-rotatable spindle and wheel rotatably mounted thereon of means for locking the wheel to the spindle to prevent movement of the vehicle, said means consisting in a non-rotatable member comprising abutting right hand and left hand nuts mounted on the spindle, a member non-rotatably connected to the wheel and slidable axially of the wheel and spindle into or out of engagement with said nuts, for the purpose set forth.

2. In a vehicle, the combination with a non-rotatable spindle and wheel rotatably mounted thereon of means for locking the wheel to the spindle to prevent movement of the vehicle, said means consisting in a non-rotatable member comprising abutting right hand and left hand nuts mounted on the spindle, a member non-rotatably connected to the wheel and slidable axially of the wheel and spindle into or out of engagement with said nuts, and means for positively locking said slidable member in either position.

3. In a vehicle, the combination with a non-rotatable spindle, a wheel rotatably mounted thereon, of means for locking the wheel to the spindle to prevent movement of the vehicle, said means comprising a non-rotatable member secured on the spindle, an axially movable member connected to the wheel but non-rotatable relatively thereto and means including an annular member having a pin and slot connection with said axially movable member for moving the latter into or out of engagement with the non-rotatable member secured on the spindle.

4. In a vehicle, the combination with a non-rotatable spindle, a wheel rotatably mounted thereon, of means for locking the wheel to the spindle to prevent movement of the vehicle, said means comprising a non-rotatable member secured on the spindle, an axially movable member connected to the wheel but non-rotatable relatively thereto, a rotatable annular member having operative connection with said axially movable member and lock controlled means for operating said annular member.

In testimony whereof I affix my signature.

JOHN McKENNEY PALMER.